US009557562B2

(12) United States Patent
Park

(10) Patent No.: US 9,557,562 B2
(45) Date of Patent: Jan. 31, 2017

(54) LASER SCANNING UNIT AND COLOR IMAGE FORMING APPARATUS INCLUDING THE SAME

(71) Applicant: Samsung Electronics Co., Ltd., Suwon-si, Gyeonggi-do (KR)

(72) Inventor: Gi-sung Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 13/649,410

(22) Filed: Oct. 11, 2012

(65) Prior Publication Data

US 2013/0141509 A1 Jun. 6, 2013

(30) Foreign Application Priority Data

Dec. 5, 2011 (KR) ........................ 10-2011-0129161

(51) Int. Cl.
*G02B 26/12* (2006.01)
*B41J 2/44* (2006.01)
*B41J 2/47* (2006.01)
*G03G 15/043* (2006.01)
*G02B 13/00* (2006.01)

(52) U.S. Cl.
CPC .............. *G02B 26/125* (2013.01); *B41J 2/442* (2013.01); *B41J 2/473* (2013.01); *G02B 26/123* (2013.01); *G03G 15/0435* (2013.01); *G02B 13/0005* (2013.01)

(58) Field of Classification Search
CPC ............................... G02B 26/125; B41J 2/442
USPC ....... 347/134, 137, 241, 243, 244, 256, 258, 347/259, 260, 261
See application file for complete search history.

(56) References Cited

U.S. PATENT DOCUMENTS

| | | | |
|---|---|---|---|
| 6,801,239 B2 | 10/2004 | Nakahata | |
| 7,099,061 B2 | 8/2006 | Tamaru | |
| 7,126,735 B1* | 10/2006 | Kinoshita et al. | 359/204.1 |
| 8,553,062 B2 | 10/2013 | Ueda | |
| 2001/0019444 A1 | 9/2001 | Takada et al. | |
| 2004/0174427 A1* | 9/2004 | Iwamoto | 347/244 |
| 2004/0174581 A1* | 9/2004 | Iizuka et al. | 359/204 |

(Continued)

FOREIGN PATENT DOCUMENTS

| | | |
|---|---|---|
| CN | 1725056 | 1/2006 |
| CN | 1794035 | 6/2006 |
| CN | 102243372 | 11/2011 |

OTHER PUBLICATIONS

Chinese Office Action dated Feb. 25, 2016 in Chinese Patent Application No. 201210518467.6.

(Continued)

*Primary Examiner* — Kristal Feggins
*Assistant Examiner* — Kendrick Liu
(74) *Attorney, Agent, or Firm* — Staas & Halsey LLP

(57) ABSTRACT

A laser scanning unit and a color image forming apparatus using the laser scanning unit. The laser scanning unit includes a deflector that is rotatable to deflect a plurality of light beams that are incident on the deflector from a plurality of light sources at an angle with respect to a sub-scanning direction; at least one optical path changing member to change an optical path of each of the light beams deflected by the deflector; and a first f-θ lens to focus the light beam that passes through the optical path changing member onto a corresponding scanning target surface.

24 Claims, 3 Drawing Sheets

(56) References Cited

U.S. PATENT DOCUMENTS

| | | | |
|---|---|---|---|
| 2006/0017996 A1* | 1/2006 | Tamaru | G02B 26/123 |
| | | | 359/204.1 |
| 2006/0139715 A1* | 6/2006 | Tamaru et al. | 359/204 |
| 2007/0081216 A1* | 4/2007 | Miyatake | 359/204 |
| 2009/0278907 A1 | 11/2009 | Igarashi | |
| 2011/0115873 A1* | 5/2011 | Shimomura | 347/224 |

OTHER PUBLICATIONS

Chinese Office Action dated Oct. 20, 2016 in Chinese Patent Application No. 201210518467.6.

* cited by examiner

LASER SCANNING UNIT AND COLOR IMAGE FORMING APPARATUS INCLUDING THE SAME

CROSS-REFERENCE TO RELATED APPLICATIONS

This application claims the benefit of Korean Patent Application No. 10-2011-0129161, filed on Dec. 5, 2011, in the Korean Intellectual Property Office, the disclosure of which is incorporated herein in its entirety by reference.

BACKGROUND OF THE INVENTION

1. Field of the Invention

The present inventive concept relates to a laser scanning unit and a color image forming apparatus adopting the laser scanning unit.

2. Description of the Related Art

A laser scanning unit is an apparatus that forms electrostatic latent images by scanning laser beams onto a photosensitive drum in an image forming apparatus, such as a laser printer. A black-and-white laser printer only uses a laser scanning unit and one organic photoconductive cell (OPC) drum since only black color ink is transferred onto a print medium. In contrast, a color laser printer uses four laser scanning units and four OPC drums since inks of four colors, that is, black (K), magenta (M), yellow (Y), and cyan (C) colors, are respectively transferred onto a print medium. However, the laser scanning units incur the largest cost for manufacturing the color laser printer. Therefore, a way of reducing the manufacturing cost of color image forming apparatuses is to minimize the number of laser scanning units. Also, jitters generated by spindle motors that rotate polygonal rotating mirrors for each of the colors and periodic vibrations may be different from each other with respect to the four laser scanning units. Thus, when a line is printed on a medium, four colors are printed on different lines, thus degrading image quality. Therefore, in order to reduce manufacturing costs of the color image forming apparatus and to improve image quality, only one laser scanning unit is used to form color images.

However, scanning lines imaged on each of the photosensitive drums may be curved. When forming the color images, it is important to correct curvature of a scanning line of each single color; however, relative error of the scanning line curvature generated when each of the scanning lines are combined together may cause a severe problem when color images are formed. Therefore, a method and a configuration to correct the scanning line curvature with respect to each of the colors in order to have the same curvature amount in the same direction as each other have been variously suggested.

SUMMARY OF THE INVENTION

The present inventive concept provides a laser scanning unit capable of reducing a relative error between scanning curves by forming the scanning curves of optical paths in the same direction in an inclination incident scanning optics.

The present inventive concept also provides a color image forming apparatus which forms color images of good image quality.

Additional features and utilities of the present general inventive concept will be set forth in part in the description which follows and, in part, will be obvious from the description, or may be learned by practice of the general inventive concept.

Exemplary embodiments of the present inventive concept provide a laser scanning unit including: a first light source, a second light source, a third light source, and a fourth light source; a deflector for deflecting a first light beam, a second light beam, a third light beam, and a fourth light beam that are incident on the deflector from the first through fourth light sources at an angle with respect to a sub-scanning direction; at least one optical path changing member for changing first through fourth optical paths of the first through fourth light beams that are reflected by the deflector; and a 1-1 f-θ lens, a 1-2 f-θ lens, a 1-3 f-θ lens, and a 1-4 f-θ lens for focusing the first through fourth light beams that have passed through the at least one optical path changing member on corresponding scanning target surfaces, wherein the first through fourth light beams pass through the 1-1 through 1-4 f-θ lenses in a state of being deflected in the same direction with respect to center portions of corresponding 1-1 through 1-4 f-θ lenses in the sub-scanning direction.

Each of the first through fourth light beams incident on the deflector may be inclined at an angle ranging from 2 to 4° with respect to an optical axis in the sub-scanning direction.

The 1-1 through 1-4 f-θ lenses may have aspherical shapes that are continuously changed in the main scanning direction.

The 1-1 through 1-4 f-θ lenses may have aspherical shapes in the sub-scanning direction.

Each of the first through fourth light beams may be incident on the deflector at an angle of 90° with respect to the main scanning direction.

The first through fourth light sources may be disposed on one circuit board.

The laser scanning unit may further include a second f-θ lens on each of the first through fourth optical paths between the deflector and the at least one optical path changing member.

The second f-θ lens may have no refractive power in the sub-scanning direction.

Two first optical path changing members may be disposed on the first optical path of the light beam reflected from the deflector to a lower portion in a first direction and two second optical path changing members may be disposed on the second optical path of the light beam reflected from the deflector to an upper portion in a second direction, and one third optical path changing member may be disposed on a third optical path of the light beam reflected from the deflector to an upper portion in the first direction and one fourth optical path changing member may be disposed on a fourth optical path of the light beam reflected from the deflector to a lower portion in the second direction.

An optical path changing member may not be disposed between each of the 1-1 through 1-4 f-θ lenses and each of the corresponding scanning target surfaces.

Exemplary embodiments of the present inventive concept also provide a laser scanning unit including: a plurality of light sources; a deflector that is rotatable to deflect a plurality of light beams that are incident on the deflector from the plurality of light sources at an angle with respect to a sub-scanning direction; at least one optical path changing member to change an optical path of each of the light beams reflected by the deflector; and a first f-θ lens to focus the light beam that passes through the optical path changing member onto a corresponding scanning target surface, wherein the light beams pass through the first f-θ lens in a state of being deflected with respect to a center of the first f-θ lens in the same sub-scanning direction.

Exemplary embodiments of the present inventive concept also provide a color image forming apparatus including: a laser scanning unit; photosensitive substances on which light beams are scanned from the laser scanning unit to form electrostatic latent images; and developing units to develop the electrostatic latent images; wherein the laser scanning unit includes a first light source, a second light source, a third light source, and a fourth light source; a deflector to deflect a first light beam, a second light beam, a third light beam, and a fourth light beam that are incident on the deflector from the first through fourth light sources at an angle with respect to a sub-scanning direction; at least one optical path changing member to change first through fourth optical paths of the first through fourth light beams that are reflected by the deflector; and a 1-1 f-θ lens, a 1-2 f-θ lens, a 1-3 f-θ lens, and a 1-4 f-θ lens to focus the first through fourth light beams that have passed through the at least one optical path changing member on corresponding scanning target surfaces, wherein the first through fourth light beams pass through the 1-1 through 1-4 f-θ lenses in a state of being deflected in the same direction with respect to center portions of corresponding 1-1 through 1-4 f-θ lenses in the sub-scanning direction.

Exemplary embodiments of the present inventive concept also provide a color image forming apparatus including: a laser scanning unit; photosensitive substances on which light beams are scanned from the laser scanning unit to form electrostatic latent images; and developing units to develop the electrostatic latent images; wherein the laser scanning unit includes: a plurality of light sources; a deflector that is rotatable to deflect a plurality of light beams that are incident on the deflector from the plurality of light sources at an angle with respect to a sub-scanning direction; at least one optical path changing member to change an optical path of each of the light beams reflected by the deflector; and a first f-θ lens to focus the light beam that passes through the optical path changing member onto a corresponding scanning target surface, wherein the light beams pass through the first f-θ lens in a state of being deflected with respect to a center of the first f-θ lens in the same sub-scanning direction.

Exemplary embodiments of the present inventive concept also provide a laser scanning unit comprising: a deflector to deflect a plurality of light beams at a predetermined angle with respect to a sub-scanning direction; at least one optical path changing member associated with each of the plurality of light beams to change the optical path of the respective light beam deflected by the deflector; and an f-θ lens corresponding to each of the plurality of deflected light beams to focus the deflected beams on respective scanning light surfaces, each of the f-θ lens receiving the deflected beam from a respective at least one optical path changing member at the same deflected amount and direction with respect to center portions of the respective f-θ lens in the sub-scanning direction.

In an embodiment, the number of optical path changing members associated with at least one of the light beams is different than the number of optical path changing members associated with the remaining light beams.

In an embodiment, the number of optical path changing members associated with some of the light beams is twice the number of optical path changing members associated with the remaining light beams.

BRIEF DESCRIPTION OF THE DRAWINGS

These and/or other features and utilities of the present general inventive concept will become more apparent and readily appreciated from the following description of the embodiments, taken in conjunction with the accompanying drawings of which.

DETAILED DESCRIPTION OF THE PREFERRED EMBODIMENTS

Figure 1:
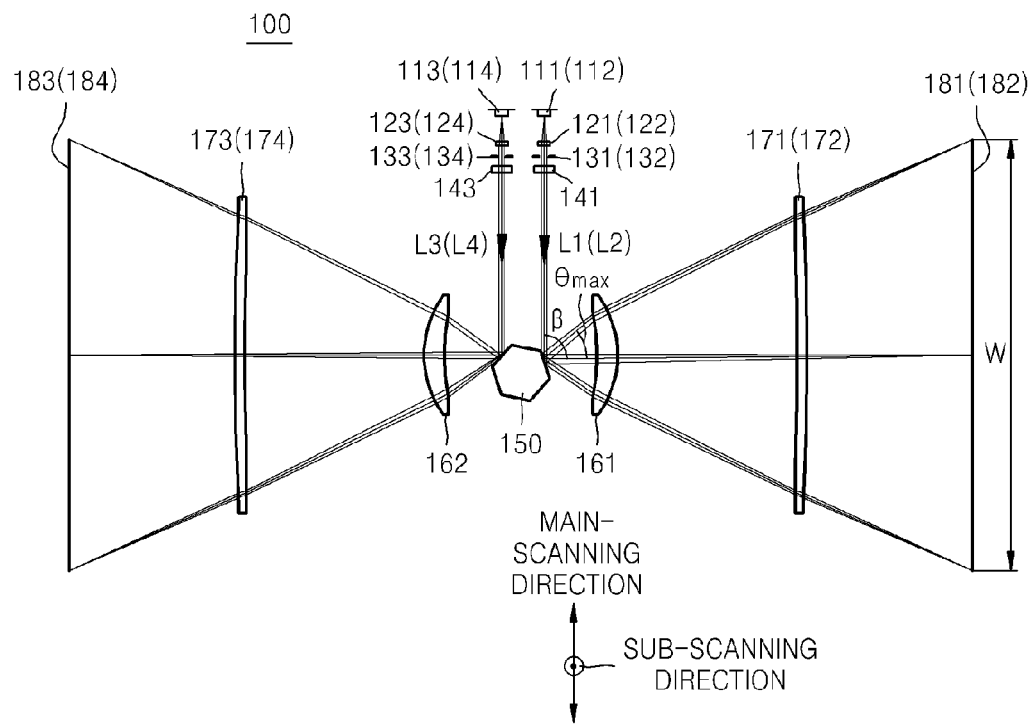
FIG. 1 is a top view of a laser scanning unit in a main scanning direction according to an embodiment of the present inventive concept.

The present inventive concept will now be described more fully with reference to the accompanying drawings, in which exemplary embodiments of the invention are shown. The inventive concept may, however, be embodied in many different forms and should not be construed as being limited to the embodiments set forth herein; rather, these embodiments are provided so that this disclosure will be thorough and complete, and will fully convey the concept of the inventive concept to those skilled in the art. In the drawings, the thicknesses of layers and regions are exaggerated for clarity. It will also be understood that when a layer is referred to as being "on" another layer or substrate, it can be directly on the other layer or substrate, or intervening layers may also be present. Expressions such as "at least one of," when preceding a list of elements, modify the entire list of elements and do not modify the individual elements of the list.

FIG. 1 is a partial plan view of a laser scanning unit 100 according to an embodiment of the present inventive concept. The laser scanning unit 100 includes a plurality of light sources, a deflector 150 to polarize light beams incident from the plurality of light sources, and an optical system to focus the light beams on a scanning target surface.

The plurality of light sources may include a first light source 111 and a second light source 112 disposed in up-and-down directions, and a third light source 113 and a fourth light source 114 disposed respectively in parallel with the first and second light sources 111 and 112. However, the number of light sources and arrangement form of the light sources are not limited thereto. The plurality of light sources may be disposed on one circuit board. The first through fourth light sources 111, 112, 113, and 114 may include laser diodes irradiating first through fourth light beams L1, L2, L3, and L4, respectively. The first through fourth light beams L1, L2, L3, and L4 emitted from the first through fourth light sources 111, 112, 113, and 114, respectively, may be incident on the deflector 150 at an angle with respect to a sub-scanning direction. Hereinafter, first through fourth optical paths of the first through fourth light beams L1, L2, L3, and L4 are denoted by the same reference numerals as the first through fourth light beams L1, L2, L3, and L4.

Figure 2:
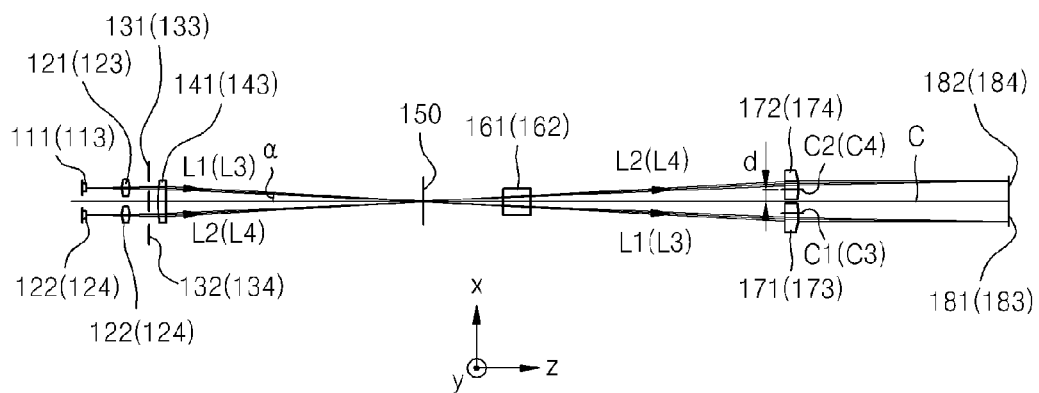
FIG. 2 is a side view of the laser scanning unit in a sub-scanning direction according to the embodiment of the present inventive concept in a state where optical paths are unfolded.

FIG. 2 is a side view of the laser scanning unit 100 in a state where the optical paths are unfolded, for the convenience of description.

The first light beam L1 irradiated from the first light source 111 is incident on the deflector 150 at an angle with the sub-scanning direction (x-axis direction). The second through fourth light beams L2 through L4 irradiated from the second through fourth light sources 112 through 114 are respectively incident on the deflector 150 at an angle with the sub-scanning direction (x-axis direction). For example, each of the first through fourth light beams L1 through L4 may be incident on the deflector 150 at an angle of α with respect to an optical axis C. The angle a may range from 2 to 4°. By using an inclination optical system, a size of the light scanning unit 100 may be reduced. Reducing a thickness of the deflector 150 may be one of elements to reduce the size of the laser scanning unit 100. Here, since the light beams are incident on the deflector 150 at an angle, a thickness of an effective surface of the deflector 150, on which the light beams are incident, may be reduced, thereby reducing the size of the deflector 150. On the other hand, the first through fourth light beams L1 through L4 may be incident on the deflector 150 at a main-scanning incident angle of about 90°. The main-scanning incident angle is an angle between a light beam incident on the deflector 150 and a perpendicular line of a scanning target surface (refer to β of FIG. 1).

In the present embodiment, the deflector 150 may be commonly used by the first through fourth light sources 111 through 114. The deflector 150 may include a polygonal rotating mirror that is rotated by a motor (not shown). The deflector 150 may include, for example, six or more mirror surfaces.

A first collimating lens 121 is disposed between the first light source 111 and the deflector 150, and a second collimating lens 122 is disposed between the second light source 112 and the deflector 150. In addition, a third collimating lens 123 may be disposed between the third light source 113 and the deflector 150, and a fourth collimating lens 114 may be disposed between the fourth light source 114 and the deflector 150. A first cylindrical lens 141 may be disposed between the first collimating lens 121 and the deflector 150 and between the second collimating lens 122 and the deflector 150. The first cylindrical lens 141 may be commonly used by the first light beam L1 and the second light beam L2. In addition, a second cylindrical lens 143 may be disposed between the third collimating lens 123 and the deflector 150 and between the fourth collimating lens 124 and the deflector 150. The second cylindrical lens 143 may be commonly used by the third light beam L3 and the fourth light beam L4. However, separate cylindrical lenses may be disposed with respect to the first through fourth light beams L1 through L4, respectively.

The first through fourth collimating lenses 121 through 124 make the light beams emitted from the first through fourth light sources 111, 112, 113, and 114, respectively, parallel light beams, and the first and second cylindrical lenses 141 and 143 may converge the parallel light beams on the deflector 150. In addition, a first aperture diaphragm 131 and a second aperture diaphragm 132 may be disposed, respectively, between the first collimating lens 121 and the first cylindrical lens 141 and between the second collimating lens 122 and the first cylindrical lens 141. In addition, a third aperture diaphragm 133 and a fourth aperture diaphragm 134 may be disposed, respectively, between the third collimating lens 123 and the second cylindrical lens 143 and between the fourth collimating lens 124 and the second cylindrical lens 143. Diameters of the first through fourth light beams L1 through L4 may be changed by the first through fourth aperture diaphragms 131 through 134, respectively.

The optical system that focuses each of the light beams deflected by the deflector 150 to the scanning target surface may include at least one f-θ lens. For example, a 1-1 f-θ lens 171 may be disposed between the deflector 150 and a first scanning target surface 181, and a 1-2 f-θ lens 172 may be disposed between the deflector 150 and a second scanning target surface 182. In addition, a 1-3 f-θ lens 173 may be disposed between the deflector 150 and a third scanning target surface 183, and a 1-4 f-θ lens 174 may be disposed between the deflector 150 and a fourth scanning target surface 184.

When the first light beam L1 passes through the 1-1 f-θ lens 171, the first light beam L1 deflects from a first center axis C1 of the 1-1 f-θ lens 171, and when the second light beam L2 passes through the 1-2 f-θ lens 172, the second light beam L2 deflects from a second center axis C2 of the 1-2 f-θ lens 172. The 1-1 f-θ lens 171 and the 1-2 f-θ lens 172 may be disposed such that the respective light beams L1 and L2 are deflected as much as d from the center axis C of the deflector 150. For example, in the present embodiment, a distance d (hereinafter, referred to as an eccentric amount) from the center axis C of the deflector 150 and the first center axis C1 of the 1-1 f-θ lens 171 is about 4.7 mm. However, the eccentric amount d is not limited thereto, and may have a range of 1<d<10 mm according to the optical path of the laser scanning unit 100. The distance d from the center axis C of the deflector 150 to the second center axis C2 of the 1-2 f-θ lens 172 may have the same range as described above. In addition, when the third light beam L3 passes through the 1-3 f-θ lens 173, the third light beam L3 deflects from a third center axis C3 of the 1-3 f-θ lens 173, and when the fourth light beam L4 passes through the 1-4 f-θ lens 174, the fourth light beam L4 deflects from a fourth center axis C4 of the 1-4 f-θ lens 174. The 1-3 f-θ lens 173 and the 1-4 f-θ lens 174 may be disposed such that the respective light beams L3 and L4 are deflected as much as d from the center axis C of the deflector 150. For example, in the present embodiment, a distance (eccentric amount) d from the center axis C of the deflector 150 and the third center axis C3 of the 1-3 f-θ lens 173 is about 4.7 mm. However, the eccentric amount d is not limited thereto, and may have a range of 1<d<10 mm according to the optical path of the laser scanning unit 100. The distance d from the center axis C of the deflector 150 to the fourth center axis C4 of the 1-4 f-θ lens 174 may have the same range as described above. The 1-1, 1-2, 1-3, and 1-4 f-θ lenses 171 through 174 may have aspherical shapes that are continuously changed with respect to the main scanning direction. In addition, the 1-1, 1-2, 1-3, and 1-4 f-θ lenses 171 through 174 may have aspherical shapes that are continuously changed with respect to the sub-scanning direction.

On the other hand, a 2-1 f-θ lens 161 may be further disposed between the deflector 150 and the 1-1 f-θ lens 171 and the 1-2 f-θ lens 172. The 2-1 f-θ lens 161 may be used commonly by the first light beam L1 and the second light beam L2. However, the present embodiment is not limited thereto, and the 2-1 f-θ lens 161 may be disposed with respect to each of the first light beam L1 and the second light beam L2. In addition, a 2-2 f-θ lens 162 may be further disposed between the deflector 150 and the 1-3 f-θ lens 173 and the 1-4 f-θ lens 174. The 2-2 f-θ lens 162 may be commonly used by the third light beam L3 and the fourth light beam L4. However, the present embodiment is not limited thereto, and the 2-2 f-θ lens 162 may be respectively disposed with respect to each of the third light beam L3 and the fourth light beam L4. The 2-1 and 2-2 f-θ lenses 161 and 162 may have no refractive power in the sub-scanning direction. On the other hand, the 2-1 and 2-2 f-θ lenses 161 and 162 may have refractive power in the main scanning direction.

Figure 3:
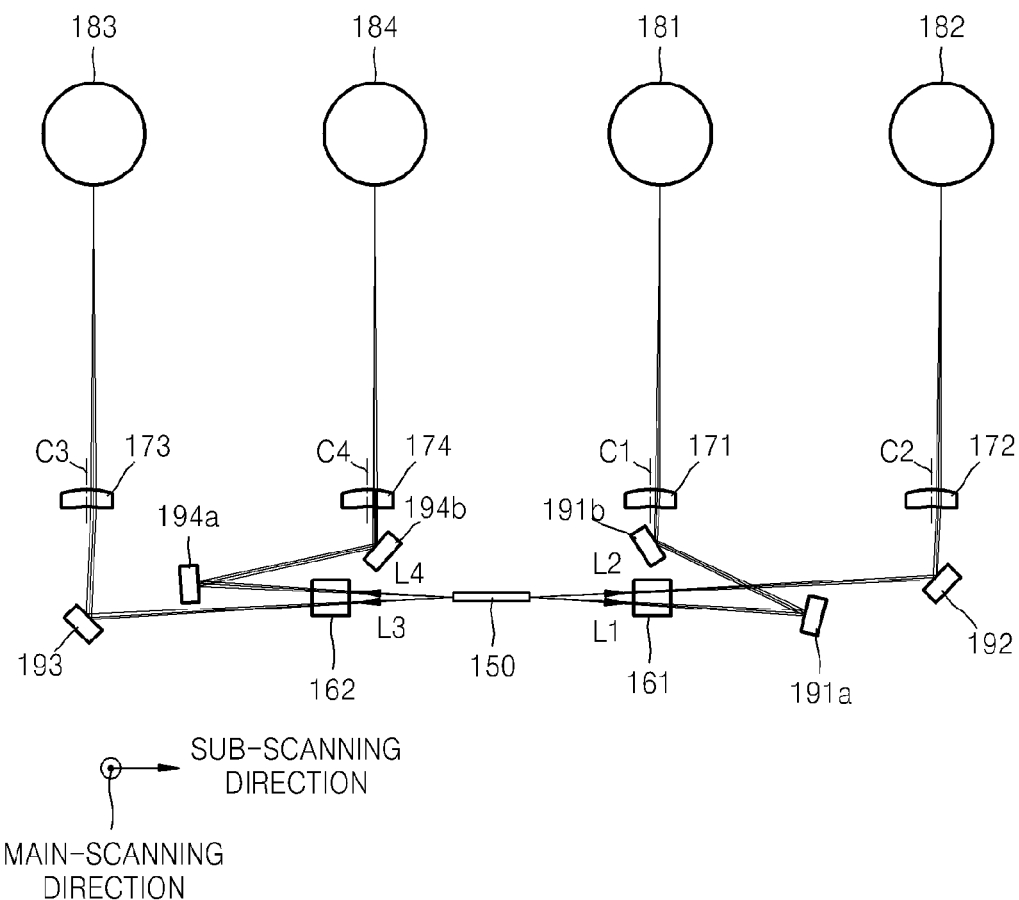
FIG. 3 is a side view of the laser scanning unit in the sub-scanning direction according to the embodiment of the present inventive concept in a state where the optical path is folded.

FIG. 3 is a side view of the laser scanning unit 100 in a state where the optical path is folded, whereas FIG. 2 shows the state where the optical path is unfolded. In FIG. 3, a photosensitive substance, for example, a photosensitive drum, is used as the scanning target surface. As shown in FIG. 3, at least one optical path changing member may be disposed on each of the optical paths between the deflector 150 and each of the 1-1 to 1-4 f-θ lenses. The at least one optical path changing member may be a reflective mirror.

For example, referring to FIG. 3, at least one first optical path changing member is disposed on the first path L1 of the light beam that is reflected by the deflector 150 to a lower side direction (right lower portion in FIG. 3), and at least one second optical path changing member may be disposed on the second path L2 of the light beam reflected from the deflector 150 to an upper side direction (right upper portion in FIG. 3). In addition, at least one third optical path changing member is disposed on the third path L3 of the light beam that is reflected by the deflector 150 to the other lower side direction (left lower portion in FIG. 3), and at least one fourth optical path changing member may be disposed on the fourth path L4 of the light beam reflected from the deflector 150 to the other upper side direction (left upper portion in FIG. 3).

The number of first optical path changing members and the number of fourth optical path changing members are the same as each other, that is, n, and the number of second optical path changing members and the number of third optical path changing members are the same as each other, that is, m. Here, the difference between n and m may be 1. For example, two first optical path changing members and two fourth optical path changing members may be included, and one second optical path changing member and one third optical path changing member may be included. The first optical path changing member may include a 1-1 optical path changing member 191a and a 1-2 optical path changing member 191b, and the fourth optical path changing member may include a 4-1 optical path changing member 194a and a 4-2 optical path changing member 194b. In addition, the second optical path changing member may be one member denoted by reference numeral 192, and the third optical path changing member may be one member denoted by reference numeral 193. Alternatively, three first optical path changing members and three fourth optical path changing members may be provided along the first and fourth paths, and two second optical path changing members and two third optical path changing members may be provided along the second and third paths.

Next, operations of forming scanning curves in the same direction on first through fourth scanning target surfaces 181, 182, 183, and 184 according to an arrangement of the optical path changing members shown in FIG. 3 will be described. Referring to FIG. 4A, a first scanning curve LB1 formed by the deflection of the first light beam L1, which is emitted from the first light source 111, in the deflector 150 and a second scanning curve LB2 formed by the deflection of the second light beam L2, which is emitted from the second light source 112, in the deflector 150 are formed in opposite directions to each other, before passing through the respective optical path changing members. In addition, a third scanning curve LB3 formed by the deflection of the third light beam L3, which is emitted from the third light source 113, in the deflector 150 and a fourth scanning curve LB4 formed by the deflection of the fourth light beam L4, which is emitted from the fourth light source 114, in the deflector 150 are formed in opposite directions to each other, before passing through the respective optical path changing members.

Referring to FIG. 4B, the first light beam L1 is focused on the first scanning target surface 181 without changing the direction of the first scanning curve LB1, while being reflected by the 1-1 and 1-2 optical path changing members 191a and 191b. The second light beam L2 is focused on the second scanning target surface 182 while changing the second scanning curve LB2 in an opposite direction, after being reflected by the second optical path changing member 192. The third light beam L3 is focused on the third scanning target surface 183 while changing the third scanning curve LB3 in the opposite direction, after being reflected by the third optical path changing member 193. The fourth light beam L4 is focused on the fourth scanning target surface 184 without changing the direction of the fourth scanning curve LB4, while being reflected by the 4-1 and 4-2 optical path changing members 194a and 194b. Consequently, the first through fourth scanning curves LB1 through LB4 are all formed in the same direction. As described above, in the present embodiment, the number of optical path changing members disposed on each of the optical paths may be changed in order to make the directions of the scanning curves the same as each other, thereby reducing relative errors in the scanning curves.

Figure 4:
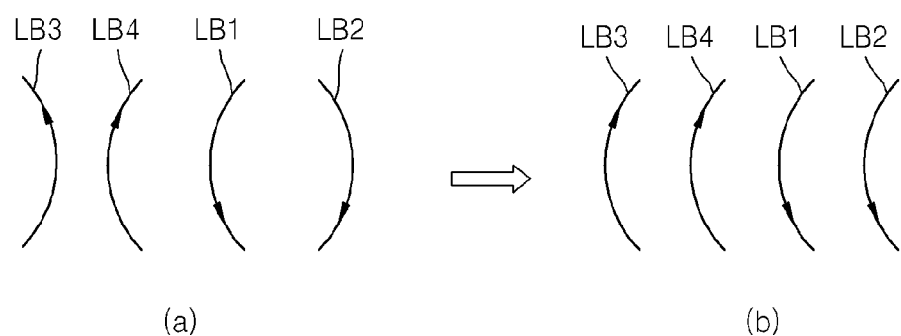
FIG. 4 is a diagram showing scanning curves formed in the laser scanning unit according to the embodiment of the present inventive concept.

In the laser scanning unit 100 of the present embodiment, as shown in FIG. 1, the first through fourth optical paths L1 through L4 from the first through fourth light sources 111 through 114 to the deflector 150 may be symmetrical about a center line of the deflector 150 in the main scanning direction. On the other hand, as shown in FIG. 3, the first through fourth optical paths L1 through L4 from the deflector 150 to the 1-1 through 1-4 f-θ lenses 171 through 174 may be asymmetrical about the center line of the deflector 150 in the main scanning direction. As described above, when the first through fourth optical paths L1 through L4 after the deflector 150 are asymmetrical with each other, a color registration may become excellent. In addition, the directions of the scanning curves formed on the scanning target surfaces may be changed to be the same as each other by controlling the number of optical path changing members disposed on the first and fourth optical paths L1 and L4 and the number of optical path changing members disposed on the second and third optical paths L2 and L3. FIG. 4 shows the example in which the scanning curves are formed in the same direction. When the difference between the number n of the optical path changing members disposed on the first and fourth optical paths L1 and L4 and the number m of the optical path changing members disposed on the second and third optical paths L2 and L3 is one, the scanning curves may be formed in the same direction. As described above, when the scanning curves are formed in the same direction, the relative error between the scanning curves may be reduced. Therefore, color registration may be improved.

On the other hand, in the laser scanning unit 100 of the present embodiment, a first f-θ lens may be disposed between an optical path changing member and a scanning target surface on each of the optical paths. For example, the 1-1 f-θ lens 171 is disposed between the 1-2 optical path changing member 191b and the first scanning target surface 181, and the 1-2 f-θ lens 172 may be disposed between the second optical path changing member 192 and the second scanning target surface 182. In addition, the 1-3 f-θ lens 173 may be disposed between the third optical path changing member 193 and the third scanning target surface 183, and the 1-4 f-θ lens 174 may be disposed between the 4-2 optical path changing member 194b and the fourth scanning target surface 184. As described above, the 1-1 through 1-4 f-θ lenses 171 through 174 are disposed adjacent to the first through fourth scanning target surfaces 181 through 184, and thus, a high focusing effect may be obtained. In addition, the first through fourth light beams L1 through L4 may be respectively deflected in the same directions with respect to the first through fourth center lines C1 through C4 of the 1-1 through 1-4 f-θ lenses 171 through 174, and then may pass through the 1-1 through 1-4 f-θ lenses 171 through 174. Therefore, the relative errors between the scanning curves formed on the scanning target surfaces may be reduced. In addition, a size of an effective surface of a first f-θ lens may be reduced.

Detailed configurations of the laser scanning unit 100 according to an embodiment of the present inventive concept are shown in following Table 1.

TABLE 1

Configurations of laser scanning unit

| | | |
|---|---|---|
| Maximum effective viewing angle [deg] | θmax | 35.1 |
| Effective scanning width [mm] | W | 216 |
| Inclination incident angle [deg] | α | 3 |
| Wavelength, refractive index | | |
| Used wavelength [nm] | λ | 786.5 |
| Refractive index of the first f-θ lens and the second f-θ lens | N | 1.537 |
| Arrangement of imaging optics [mm] | | |
| Distance from deflector to incident surface of second f-θ lens | L1 | 29.2 |
| Distance from incident surface of second f-θ lens to exit surface of second f-θ lens | L2 | 10 |
| Distance from exit surface of second f-θ lens to incident surface of first f-θ lens | L3 | 92.4 |
| Distance from incident surface of first f-θ lens to exit surface of first f-θ lens | L4 | 5 |
| Distance from exit surface of first f-θ lens to scanning target surface | L5 | 83.2 |

In Table 1, the maximum effective viewing angle (θmax) is an angle formed by the light beam reflected by the deflector 150 to the outermost portion of the scanning target surface and a perpendicular line of the scanning target surface, as shown in FIG. 1. The effective scanning width W denotes an entire width of the scanning line on the scanning target surface. In addition, the inclined incident angle α is described with reference to FIG. 2.

On the other hand, the 2-1 and 2-2 f-θ lenses 161 and 162 and the 1-1 through 1-4 f-θ lenses 171 through 174 may be aspherical lenses. The aspherical shapes of the incident surfaces and the exit surfaces of a first f-θ lens and a second f-θ lens may be represented by following equation:

$$z = \frac{C_1 |y|^2}{1+\sqrt{1-C_1^2 |y|^2}} + \sum_n A_n |y|^n + \frac{C_2 |x|^2}{1+\sqrt{1-C_2^2 |x|^2}} + \sum_{m,n} E_{mn} |y|^m |x|^n \quad (1)$$

where when it is assumed that an optical axis direction is a z-axis, the sub-scanning direction is an x-axis, and the main scanning direction is a y-axis, z denotes a distance from a vertex of the lens to any point of the aspherical surface in the optical axis direction, x denotes a distance from the vertex of the lens to any point of the aspheric surface in the sub-scanning direction, y denotes a distance from the vertex of the lens to any point of the aspheric surface in the main scanning direction, $C_1$ denotes a curvature in the main scanning direction, and $C_2$ denotes a curvature in the sub-scanning direction. In addition, $A_n$ and $E_{mn}$ denote deformation terms.

Table 2 below shows deformation terms of the first f-θ lens and the second f-θ lens in the main scanning direction. In Table 2, the light source side denotes a side adjacent to the light source, and anti-light source side denotes a side apart from the light source.

When a lens is divided into two parts based on a vertex in the main scanning direction, the shape of a part adjacent to the light source is determined according to the light source side deformation term, and the shape of the other part apart from the light source is determined according to the anti-light source side deformation term.

That is, aspherical data located on the left portion of Table 2 corresponds to the 2-1 and 2-2 f-θ lenses 161 and 162, and the aspherical data located on right portion of Table 2 and aspherical data of Table 3 correspond to the 1-1 through 1-4 f-θ lenses 171 through 174.

TABLE 2

| | Second f-θ lens | | First f-θ lens | |
|---|---|---|---|---|
| | Incident surface | Exit surface | Incident surface | Exit surface |
| R( | −1.003E+02 | −5.303E+01 | — | 3.984E+ |
| A1 | 8.443E−03 | 6.768E−03 | 7.463E−04 | 3.834E− |
| A2 | −2.421E−04 | −9.515E−04 | −4.160E− | −9.825E− |
| A3 | 3.224E−06 | 3.136E−06 | 1.270E−06 | 1.411E− |
| A4 | 1.748E−06 | 1.133E−06 | 2.606E−08 | −1.753E− |
| A5 | −2.367E−08 | −8.675E−09 | 2.674E−10 | 7.044E− |
| A6 | 2.569E−10 | 4.232E−10 | −2.894E− | 5.207E− |
| A7 | 4.416E−12 | 6.741E−13 | 3.884E−14 | 6.494E− |
| A8 | −1.051E−12 | −1.127E−13 | −1.735E− | −1.326E− |
| A9 | 8.807E−15 | −7.698E−15 | −7.126E− | 3.140E− |
| A1 | 2.230E−16 | 3.454E−17 | 2.867E−20 | −1.849E− |
| A1 | −8.443E−03 | −6.768E−03 | −7.463E− | −3.834E− |
| A2 | −2.421E−04 | −9.515E−04 | −4.160E− | −9.825E− |
| A3 | −3.224E−06 | −3.136E−06 | −1.270E− | −1.411E− |
| A4 | 1.653E−06 | 1.061E−06 | 9.982E−08 | −9.847E− |
| A5 | −1.232E−08 | −2.154E−09 | −9.326E− | 8.224E− |
| A6 | 4.586E−10 | 2.825E−10 | 3.267E−12 | 1.380E− |
| A7 | −6.775E−12 | 7.445E−12 | −2.006E− | 7.874E− |
| A8 | −1.362E−12 | −2.169E−13 | −9.312E− | −1.619E− |
| A9 | 9.029E−16 | −1.612E−14 | −1.463E− | 1.304E− |
| A1 | 7.009E−16 | 1.357E−16 | 3.609E−20 | 1.180E− |

The following Table 3 shows the deformation terms of the first f-θ lens in the sub-scanning direction.

TABLE 3

| | First f-θ lens | |
|---|---|---|
| | Incident | Exit |
| C | −1.375E−02 | −4.337E−02 |
| E | 6.449E−05 | −3.143E−03 |
| E | 4.952E−07 | 1.376E−06 |
| E | 1.738E−10 | −6.556E−11 |
| E | −1.801E−14 | 1.462E−14 |
| E | −2.767E−18 | −2.561E−18 |
| E | −1.245E−22 | −3.268E−22 |
| E | 2.243E−05 | 2.654E−05 |
| E | −6.812E−09 | −5.866E−09 |

TABLE 3-continued

First f-θ lens

| | Incident | Exit |
|---|---|---|
| E | −9.768E−13 | 3.105E−13 |
| E | −5.610E−17 | −1.914E−16 |
| E | 3.633E−20 | −7.598E−21 |
| E | 4.734E−24 | 8.556E−24 |
| E | 6.449E−05 | −3.143E−03 |
| E | 4.952E−07 | 1.376E−06 |
| E | 1.291E−10 | −8.604E−11 |
| E | −5.163E−15 | 2.032E−14 |
| E | 1.735E−19 | 4.715E−19 |
| E | −3.964E−22 | −5.652E−22 |
| E | 2.243E−05 | 2.654E−05 |
| E | −6.812E−09 | −5.866E−09 |
| E | −1.418E−12 | 3.304E−14 |
| E | 1.049E−16 | −1.231E−16 |
| E | 3.313E−20 | −1.337E−21 |
| E | 2.266E−24 | 7.059E−24 |

As described above, the 2-1 and 2-2 f-θ lenses 161 and 162, and the 1-1 through 1-4 f-θ lenses 171 through 174 may be formed as aspherical lenses. The 2-1 and 2-2 f-θ lenses 161 and 162 may have no refractive power in the sub-scanning direction.

Figure 5:
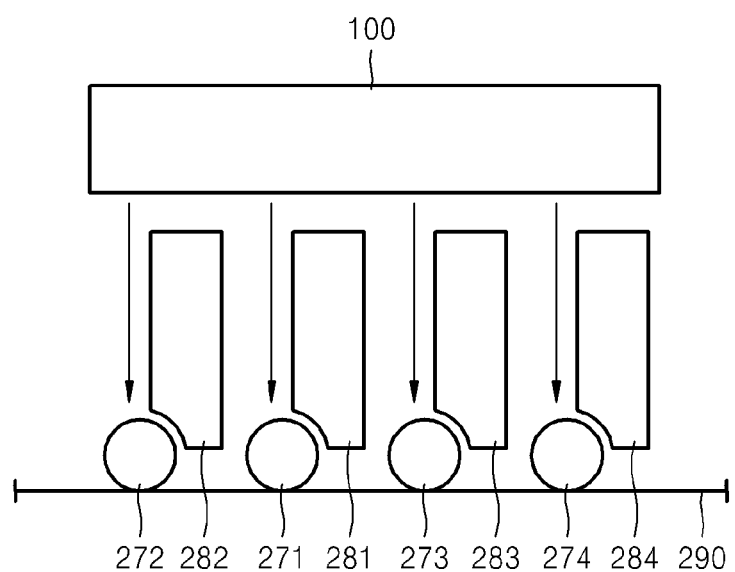
FIG. 5 is a schematic diagram of a color image forming apparatus including the laser scanning unit, according to an embodiment of the present inventive concept.

FIG. 5 is a schematic diagram of a color image forming apparatus including the laser scanning unit 100 of an embodiment of the present inventive concept to form color images. The laser scanning unit 100 is described above with reference to FIGS. 1 through 3, and detailed descriptions about the laser scanning unit 100 will not be repeated here.

In the color image forming apparatus of FIG. 5, the laser scanning unit 100 scans light beams on the first through fourth scanning target surfaces, for example, first through fourth photosensitive substances 271, 272, 273, and 274, through the deflector 150 in order to form electrostatic latent images. Here, the scanning lines formed on the photosensitive substances 271, 272, 273, and 274 are curved in the same direction by the optical path changing members disposed on the optical paths. Therefore, the relative errors between the scanning curves may be reduced. Developing agents are provided from first, second, third, and fourth developers 281, 282, 283, and 284 respectively corresponding to the first, second, third, and fourth photosensitive substances 271, 272, 273, and 274 to develop the electrostatic latent images. The developed electrostatic latent images of the colors are transferred onto a transfer medium 290 to form a color image. That is, a first scanning line transferred on the transfer medium 290 from the first photosensitive substance 271, a second scanning line transferred on the transfer medium 290 from the second photosensitive substance 272, a third scanning line transferred from the third photosensitive substance 273, and a fourth scanning line transferred from the fourth photosensitive substance 274 overlap with each other sequentially to form a color image, and then the color image is fused into the transfer medium 290. In the color image, the scanning curves are formed in the same direction, and thus, the relative error between the scanning curves may be reduced and a color image of high image quality may be provided.

Also, when first through fourth light beams reflected by the deflector of the laser scanning unit transmit through corresponding first f-θ lenses, the first through fourth light beams are deflected in the same direction with respect to the center line of the first f-θ lens, and accordingly, the relative error between the scanning curves may be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A laser scanning unit comprising:
   a first light source, a second light source, a third light source, and a fourth light source;
   a deflector to deflect a first light beam, a second light beam, a third light beam, and a fourth light beam that are incident on the deflector from the first through fourth light sources at an angle with respect to a sub-scanning direction;
   at least one optical path changing member to change first through fourth optical paths of the first through fourth light beams that are reflected by the deflector; and
   a 1-1 f-θ lens, a 1-2 f-θ lens, a 1-3 f-θ lens, and a 1-4 f-θ lens to focus the first through fourth light beams, respectively, from the at least one optical path changing member onto corresponding scanning target surfaces,
   wherein each of the 1-1 f-θ lens, the 1-2 f-θ lens, the 1-3 f-θ lens, and the 1-4 f-θ lens is disposed such that each of the first through fourth light beams passes through a center of a corresponding one of the 1-1 through 1-4 f-θ lenses in a state of being offset in the same direction with respect to an optical axis of the corresponding one of the 1-1 through 1-4 f-θ lenses in the sub-scanning direction, and
   wherein the optical axis of each of the 1-1 f-θ lens, the 1-2 f-θ lens, the 1-3 f-θ lens, and the 1-4 f-θ lens is perpendicular to the sub-scanning direction.

2. The laser scanning unit of claim 1, wherein each of the first through fourth light beams incident on the deflector is inclined at an angle ranging from 2 to 4° with respect to an optical axis in the sub-scanning direction.

3. The laser scanning unit of claim 1, wherein the 1-1 through 1-4 f-θ lenses have aspherical shapes that are continuously changed in a main scanning direction.

4. The laser scanning unit of claim 1, wherein the 1-1 through 1-4 f-θ lenses have aspherical shapes in the sub-scanning direction.

5. The laser scanning unit of claim 1, wherein each of the first through fourth light beams is incident on the deflector at a main-scanning incident angle of 90°, wherein the main-scanning incident angle is formed by each of the first through fourth light beams incident on the deflector and a perpendicular line of a scanning target surface.

6. The laser scanning unit of claim 1, wherein the first through fourth light sources are disposed on one circuit board.

7. The laser scanning unit of claim 1, further comprising:
   a second f-θ lens on each of the first through fourth optical paths between the deflector and the at least one optical path changing member.

8. The laser scanning unit of claim 7, wherein the second f-θ lens has no refractive power in the sub-scanning direction.

9. The laser scanning unit of claim 1, wherein two first optical path changing members of the at least one optical path changing member are disposed on the first optical path of the light beam reflected from the deflector to a lower portion in a first direction and two second optical path changing members of the at least one optical path changing member are disposed on the second optical path of the light beam reflected from the deflector to an upper portion in a second direction, and one third optical path changing member of the at least one optical path changing member is disposed on the third optical path of the light beam reflected from the deflector to an upper portion in the first direction and one fourth optical path changing member of the at least one optical path changing member is disposed on the fourth optical path of the light beam reflected from the deflector to a lower portion in the second direction.

10. The laser scanning unit of claim 1, wherein an optical path changing member of the at least one optical path changing member is not disposed between each of the 1-1 through 1-4 f-θ lenses and each of the corresponding scanning target surfaces.

11. A laser scanning unit comprising:
a plurality of light sources;
a deflector that is rotatable for deflecting a plurality of light beams that are incident on the deflector from the plurality of light sources at an angle with respect to a sub-scanning direction;
at least one optical path changing member for changing an optical path of each of the light beams reflected by the deflector; and
a plurality of first f-θ lenses for focusing the plurality of light beams that pass through the at least one optical path changing member onto corresponding scanning target surfaces,
wherein each of the plurality of first f-θ lenses is disposed such that each of the plurality of light beams passes through a center of a corresponding one of the plurality of first f-θ lenses in a state of being offset in the same direction with respect to an optical axis of the corresponding one of the plurality of first f-θ lenses in the sub-scanning direction,
wherein the optical axis of each of plurality of first f-θ lenses is perpendicular to the sub-scanning direction, and
the plurality of first f-θ lenses comprises at least three first f-θ lenses.

12. The laser scanning unit of claim 11, wherein each of the light beams incident on the deflector is inclined at an angle ranging from 2 to 4° with respect to an optical axis in the sub-scanning direction.

13. The laser scanning unit of claim 11, wherein each of the plurality of first f-θ lenses has an aspherical shape that is continuously changed in a main scanning direction.

14. The laser scanning unit of claim 11, further comprising:
a second f-θ lens between the deflector and the at least one optical path changing member.

15. The laser scanning unit of claim 14, wherein the second f-θ lens has no refractive power in the sub-scanning direction.

16. The laser scanning unit of claim 11, wherein n first optical path changing member(s) of the at least one optical path changing member is/are disposed on a first optical path of the light beam reflected from the deflector to a lower portion in a first direction, n second optical path changing member(s) of the at least one optical path changing member is/are disposed on a second optical path of the light beam reflected from the deflector to an upper portion in a second direction, m third optical path changing member(s) of the at least one optical path changing member is/are disposed on a third optical path of the light beam reflected from the deflector to an upper portion in the first direction, and m fourth optical path changing member(s) of the at least one optical path changing member is/are disposed on a fourth optical path of the light beam reflected from the deflector to a lower portion in the second direction.

17. The laser scanning unit of claim 16, wherein n is 2 and m is 1.

18. The laser scanning unit of claim 11, wherein the at least one optical path changing member is not disposed between the plurality of first f-θ lenses and the corresponding scanning target surfaces.

19. A color image forming apparatus comprising:
a laser scanning unit;
photosensitive substances on which light beams are scanned from the laser scanning unit to form electrostatic latent images; and
developing units for developing the electrostatic latent images;
wherein the laser scanning unit comprises a first light source, a second light source, a third light source, and a fourth light source; a deflector for deflecting a first light beam, a second light beam, a third light beam, and a fourth light beam of the light beams that are incident on the deflector from the first through fourth light sources at an angle with respect to a sub-scanning direction; at least one optical path changing member for changing first through fourth optical paths of the first through fourth light beams that are reflected by the deflector; and a 1-1 f-θ lens, a 1-2 f-θ lens, a 1-3 f-θ lens, and a 1-4 f-θ lens for focusing the corresponding first through fourth light beams from the at least one optical path changing member on corresponding scanning target surfaces, wherein each of the 1-1 f-θ lens, the 1-2 f-θ lens, the 1-3 f-θ lens, and the 1-4 f-θ lens is disposed such that each of the first through fourth light beams passes through a center of a corresponding one of the 1-1 through 1-4 f-θ lenses in a state of being offset in the same direction with respect to an optical axis of the corresponding one of the 1-1 through 1-4 f-θ lenses in the sub-scanning direction, and
wherein the optical axis of each of the 1-1 f-θ lens, the 1-2 f-θ lens, the 1-3 f-θ lens, and the 1-4 f-θ lens is perpendicular to the sub-scanning direction.

20. A color image forming apparatus comprising:
a laser scanning unit;
photosensitive substances on which light beams are scanned from the laser scanning unit to form electrostatic latent images; and
developing units for developing the electrostatic latent images;
wherein the laser scanning unit comprises a plurality of light sources; a deflector that is rotatable for deflecting the plurality of light beams that are incident on the deflector from the plurality of light sources at an angle with respect to a sub-scanning direction; at least one optical path changing member for changing an optical path of each of the light beams reflected by the deflector; and a plurality of first f-θ lenses for focusing the corresponding plurality of light beams that pass through the at least one optical path changing member onto corresponding scanning target surfaces, wherein each of the plurality of first f-θ lenses is disposed such that each of the plurality of light beams passes through a center of a corresponding one of the plurality of first f-θ lenses in a state of being offset in the same direction with respect to an optical axis of the corresponding one of the plurality of first f-θ lenses in the sub-scanning direction, wherein the optical axis of each of plurality of first f-θ lenses is perpendicular to the sub-scanning direction, and the plurality of first f-θ lenses comprises at least three first f-θ lenses.

21. A laser scanning unit comprising:
a deflector to deflect a plurality of light beams at a predetermined angle with respect to a sub-scanning direction;
at least one optical path changing member associated with each of the plurality of light beams to change an optical path of a respective light beam of the plurality of light beams deflected by the deflector; and
f-θ lenses corresponding to the plurality of light beams to focus the respective light beams on respective scanning light surfaces, the f-θ lenses receiving the respective light beams from the respective at least one optical path changing member, wherein each of the plurality of f-θ lenses is disposed such that a direction of deflection of the respective light beam with respect to an optical axis of a center of a corresponding one of the f-θ lenses is the same as the direction of deflection of each of the other plurality of light beams, wherein the optical axis of each of plurality of f-θ lenses is perpendicular to the sub-scanning direction, and the plurality of f-θ lenses comprises at least three f-θ lenses.

22. The laser scanning unit of claim 21, wherein each of the plurality of light beams incident on the deflector is inclined at an angle ranging from 2 to 4° with respect to an optical axis in the sub-scanning direction.

23. The laser scanning unit of claim 21, wherein the number of the at least one optical path changing member associated with each of some of the plurality of light beams is different from the number of the at least one optical path changing member associated with each of the remaining some of the plurality of light beams.

24. The laser scanning unit of claim 21, wherein the number of the at least one optical path changing member associated with each of at least two of the plurality of light beams is twice the number of the at least one optical path changing member associated with each of the remaining light beams of the plurality of light beams.

* * * * *